United States Patent [19]

Strobel et al.

[11] 3,880,875
[45] Apr. 29, 1975

[54] ULTRAVIOLET ABSORBING 2-(2-HYDROXYPHENYL) 2H-1,2,3-TRIAZOLE DERIVATIVES

[76] Inventors: Albert F. Strobel, 19 Albin Road, Delmar, N.Y. 12054; Maynard L. Whitehouse, P.O. Box 341, Reading, Pa. 19603

[22] Filed: Aug. 24, 1971

[21] Appl. No.: 174,562

Related U.S. Application Data

[63] Continuation of Ser. No. 853,932, Aug. 28, 1969, abandoned.

[52] U.S. Cl............... 260/308 A; 8/165; 106/176; 252/300; 252/403; 260/45.8 N; 260/193; 260/294.9; 260/295 AM; 424/59; 424/60; 424/174
[51] Int. Cl.................. C07d 55/02; C07d 57/00; C07d 99/04
[58] Field of Search................................. 260/308 A

[56] References Cited
UNITED STATES PATENTS
3,642,813  2/1972  Kirchmayr et al............ 260/308 A Primary Examiner—Alton D. Rollins
Attorney, Agent, or Firm—Walter C. Kehm

[57] ABSTRACT

New compounds of the formula

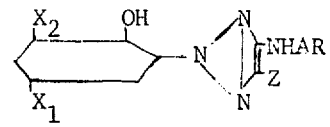

wherein A is CO or SO$_2$; R is selected from saturated hydrocarbon radicals having from 1 to 18 carbon atoms, straight chain unsaturated hydrocarbon radicals having from 2 to 18 carbon atoms, aryl substituted aryl and a heterocyclic nucleus; Z is selected from CONH$_2$ and CN; and X$_1$ and X$_2$ are selected from hydrogen, halogen, alkoxy, lower alkyl, cyano, sulfamyl, carbamyl, substituted sulfamyl, substituted carbamyl, sulfonic acid carboxylic acid, sulfonamide, carboxamide substituted sulfonamide and substituted carboxamide groups. These compounds are useful ultraviolet light absorbing agents, which are particularly suitable for the protection of normally degradable organic materials from ultraviolet radiation and of human skin from sunburn.

8 Claims, No Drawings

ULTRAVIOLET ABSORBING 2-(2-HYDROXYPHENYL) 2H-1,2,3-TRIAZOLE DERIVATIVES

This application is a continuation of application Ser. No. 853,932, filed Aug. 28, 1969, now abandoned.

This invention relates to novel 2-(2-hydroxyphenyl)-2H-1,2,3-triazole derivatives which are useful as ultraviolet light absorbing agents.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commerical applications, such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course, well known. Other effects, however, of great commercial importance relate to the photochemical degradation caused by ultra-violet radiations. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored objects such as dyed textiles will fade on exposure to sunlight, and in particular, lose their elasticity, crack and eventually completely deteriorate on exposure to sunlight. Paints, varnishes, lacquers and the like also are prone to these effects, even though here the transparency may not be paramount.

We have discovered a class of compounds which are not only compatible with a great number of film-forming plastics, resins, gums, waxes and the like, but which, further, exhibit outstanding ultra-violet absorbing properties within the ultra-violet region close to the visible spectrum, namely, in the wave length region of 3000 to 3600 A. The compounds of this invention, even though they exhibit outstanding absorbing properties close to the visible region of the electromagnetic field, nevertheless are essentially colorless compounds and can be employed with the assurance that they will not contribute to color in normally colorless formulations, nor will they affect the color of a colored formulation such as a paint film or a dyed textile.

It is therefore an object of the present invention to provide new and useful compounds characterized by outstanding ultra-violet absorbing properties.

It is a still further object of this invention to provide new and useful derivatives of 2-(2-hydroxyphenyl)-2H-1,2,3-triazole which have outstanding ultraviolet light absorbing properties.

It is another object of this invention to provide plastic materials which are normally degradable by ultra-violet light, but which are stabilized by addition thereto of the new derivatives of 2-(2-hydroxyphenyl)-2H-1,2,3-triazole.

It is still another object of this invention to provide a method for stabilizing organic materials, preferably plastics, normally degradable by ultra-violet light, by adding thereto new derivatives of 2-(2-hydroxyphenyl-2H-1,2,3-triazole.

It is yet another object of this invention to provide pharmaceutically acceptable formulations containing derivatives of 2-(2-hydroxyphenyl)-2H-1,2,3-triazole useful as ultra-violet light absorbing agents.

It is still another object of this invention to provide a method for protecting skin from sunburn by applying thereto a pharmaceutical preparation in a suitable vehicle containing ultra-violet light absorbing agents belonging to the class of 2-(2-hydroxyphenyl)-2H-1,2,3-triazole derivatives.

Other objects and advantages of the present invention will appear hereinafter from the following description.

The new and useful compounds of this invention possess the following general formula:

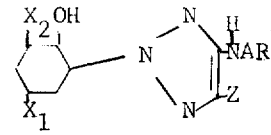

wherein A is CO or $SO_2$; R is selected from saturated hydrocarbon radicals having from 1 to 18 carbon atoms, straight chain unsaturated hydrocarbon radicals having from 2 to 18 carbon atoms, aryl substituted aryl and a heterocyclic nucleus; Z is selected from $CONH_2$ and CN; and $X_1$ and $X_2$ are selected from hydrogen, halogen, alkoxy, lower alkyl, cyano, sulfamyl, carbamyl, substituted sulfamyl, substituted carbamyl, sulfonic acid, carboxylic acid, sulfonamide, carboxamide substituted sulfonamide and substituted caboxamide groups.

As suitable saturated hydrocarbon radicals for R, there may be employed:
Methyl
Ethyl
n-Propyl
Iso-propyl
n-Butyl
Iso-butyl
Tertiary-butyl
Secondary-butyl
n-Amyl
Iso-amyl
Tertiary-amyl and the other isomeric amyls
n-Hexyl
Iso-hexyl and the other isomeric hexyls
n-Heptyl
Iso-heptyl and the other isomeric heptyls
nonyl-(2)
nonyl-(3)
nonyl-(5)

2-methyl-octyl-2
4-ethyl-heptyl-4
2-methyl-4-ethyl-hexyl-4
n-Primaryl octyl
octyl-(2) (capryl)
2-methyl-3-ethyl-pentyl-3
2,2,4-trimethyl-pentyl-4
2-ethyl-hexyl-1
3-ethyl-hexyl-3
2-methyl-heptyl-2
3-methyl-heptyl-3
4-methyl-heptyl-4
n-Primary decyl (decyl-1)
Decyl-4 (secondary decyl)
2-ethyl-octyl-3 (tertiary decyl)
4-propyl-heptyl-4 (tertiary decyl)
Undecyl-1 (n-primary decyl)
Undecyl-2 (n-secondary decyl)
Dodecyl-1 (n-dodecyl)
Tridecyl-1 (n-tridecyl)
Tridecyl-7
3-ethyl-undecyl
Tetradecyl-1 (n-tetradecyl)
Pentadecyl-1 (n-pentadecyl)
Pentadecyl-8
Hexadecyl (cetyl)
Heptadecyl-9
Octadecyl-1
2-methyl heptadecyl-2

As suitable straight chain unsaturated hydrocarbon radicals for R, there may be employed:
Allyl
Crotyl
Butenyl-1
Pentenyl-1
Decenyl-1
Decenyl-2
Undecenyl-1
Dodecenyl-2
Octadecenyl When R is an aryl group, it can be phenyl or naphthyl or substituted phenyl or naphthyl, wherein the substituent is a non-chromophoric group, such as a lower alkyl, halogen, and alkoxy group; the cyano group; sulfonic acid; carboxylic acid; sulfonamide or carboxamide and substituted sulfonamide or carboxamide. Suitable aryl radicals include phenyl, 1-naphthyl and 2-naphthyl.

Suitable substituted aryls include tolyl, xylyl, cumyl, anisole, phentole, β-diethoxyphenyl, hydroxyethylphenyl, hydroxypropylphenyl, chlorophenyl, bromophenyl, 3,4-dichlorophenyl, 2,4-dichlorophenyl, 2,4,6-trichlorophenyl, 1,2-dibromophenyl, o-chlorotolyl, n-chlorotolyl, n-bromotolyl, bromo-o-xylyl, 1,2-dichloronaphthyl, carboxyphenyl, carboxytolyl, carboxyxylyl, acetamidophenyl, o-acetamidotolyl, p-acetamidotolyl, 1-acetamidonaphthyl, 2-acetamidonaphthyl, sulfanilphenyl, 1-sulfanilnaphthyl, 2-sulfanilnaphthyl, cyanophenyl, cyanotolyls, cyanoxylyls, methoxyphenyl, ethoxyphenyl, propyloxyphenyl, octyloxyphenyl, dodecyloxyphenyl, octadecyloxyphenyl, and the corresponding alkoxy derivatives of naphthyl and of substituted phenyl such as tolyl and xylyl; sulfonylphenyl, carboxylphenyl, amidosulfonylphenyl, amidocarboxylphenyl and substituted amidosulfonylphenyl and amidocarboxylphenyl and the corresponding derivatives of 1 and 2 naphthyl, of tolyl and of xylyl.

When R is a heterocycle, it is a heterocyclic nucleus selected from the group consisting of 5 and 6 membered rings containing at least one hetero atom selected from the group consisting of oxygen, sulfur, and nitrogen; and the corresponding benzo heterocycles. As suitable heterocyclic groups for R there may be employed the following:
thiophene
furane
pyrrole
α-pyrane
γ-pyrane
pyridine
1,2-dehydropyridine
oxazole
thiazole
isoxazole
isothiazole
pyrazole
3-isopyrazole
imidazole
1,2,3-triazole
1,2,4-triazole
tetrazole
1,3,4-oxadiazole
1,2,5-oxadiazole
1,2,3-thiadiazole
1,2,3-oxathiazole
pyridazine
pyrimidine
pyrazine
1,3,5-triazine and fused ring systems of benzene with the aforementioned heterocyclics, e.g.,
benzothiophene
benzofurane
quinoline
phthalazine
benzimidazole
1,2,3-benztriazole
benzoxazole These compounds are useful in protecting organic materials susceptible to degradation by ultra-violet light, such as wood, living skin, particularly human, fats and oils, food stuffs such as butter, cosmetic preparations, photographic materials, and many others, but in particular plastics such as polyoxymethylene, polyvinyl chloride, polyamide, cellulose acetate, polyester, polyolefin, polystyrene and plastics in general in the form of solid shaped articles or as films or fibers. They may be incorporated into the melted plastic to give a homogeneous mixture, or they may be applied to the surface. They also may be incorporated in solutions, pastes, and salves for use in the cosmetic and other fields, when it is desired to protect against deterioration caused by ultra-violet light radiation.

The compounds of the present invention are prepared by diazotizing o-aminophenol and coupling the diazo compound below 10°C., with an excess of malonoamidine. This general reaction has been reported by Shaw and Wooley, *J. Biol. Chem.* 181, 89–91.

The azo compound is then cyclized by oxidation, e.g. with ammoniacal cupric sulfate, following Richter and Taylor*, who reported this reaction for the unsubstituted phenylazo malonoamide-amidine hydrochloride. Cupric sulfate, cupric chloride and other cupric salts in alkaline medium, especially in pyridine or picoline, are effective oxidizing agents. After oxidation, copper is precipitated with sodium, potassium or ammonium sulfide, and the slurry is filtered. The organic solvent, e.g. pyridine or picoline, is distilled and the residue is cooled and filtered. The pure product is obtained by recrystallization from a suitable solvent, such as ethylene glycol, ethylene glycol ethers, such as methyl, ethyl and butyl ethers, or alcohol. The two steps of the reaction are illustrated by the following scheme.

5-chloro-3-aminosalicylyl-N,N-dimethylamide
3-aminosalicylyl-N-morpholide
3-aminosalicylyl-N-piperidide
4-hydroxymetanilic acid
4-hydroxymetanilamide
4-hydroxymetanil-N-methylamide
4-hydroxymetanil-N,N-dimethylamide
4-hydroxymetanil-N-butylamide
4-hydroxymetanil-N,N-dibutylamide

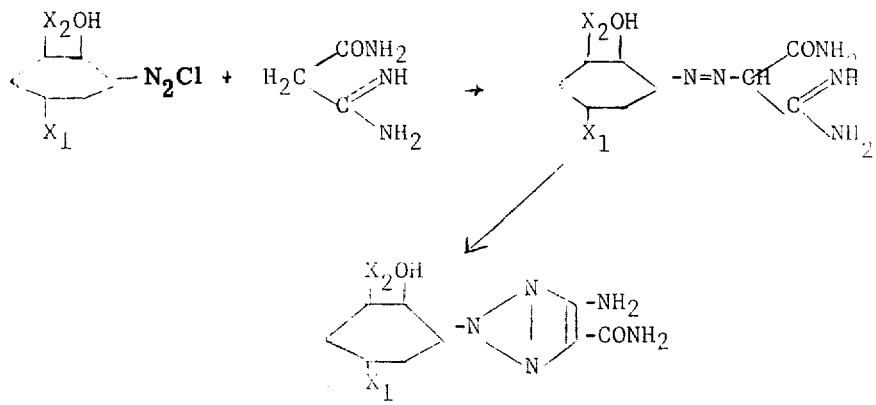

wherein $Z_1$, $X_1$ and $X_2$ have the meaning explained above.

* J. Am. Chem. Soc. 72, 5848–5850

The product of this reaction is then acylated either with an acid chloride of the general formula RAC1, wherein R and A have the meaning explained above, or with an anhydride of the general formula RAOAR, wherein R and A have the meaning explained above, in a known manner.

If desired, this final product can be further dehydrated in a known manner to form the corresponding nitrile. These nitriles have excellent ultra-violet light absorbing properties. Suitable examples of o-aminophenols which may be employed in this reaction include:

o-aminophenol
4-& 6-chloro-o-aminophenol
4,6-dichloro-o-aminophenol
4-& 6-bromo-o-aminophenol
4,6-dibromo-o-aminophenol
2-& 4-fluoro-o-aminophenol
4-methoxy-o-aminophenol
4-ethoxy-o-aminophenol
4-propoxy-o-aminophenol
4-octyloxy-o-aminophenol
4-dodecyloxy-o-aminophenol
4-octadecyloxy-o-aminophenol
5-chloro-6-methyl-o-aminophenol
5-bromo-6-methyl-o-aminophenol
4-methyl-o-aminophenol
6-chloro-4-methyl-o-aminophenol
6-bromo-4-methyl-o-aminophenol
3-aminosalicylic acid
3-aminosalicylamide
3-aminosalicylyl-N-methylamide
3-aminosalicylyl-N,N-dimethylamide
3-aminosalicylyl-N,N-dibutylamide
3-aminosalicylyl-N,N-dioctylamide
3-aminosalicylic acid nitrile
3-aminosalicyclic acid methyl ester
3-aminosalicylic acid ethyl ester
5-chloro-3-aminosalicylylamide 4-hydroxymetanil-N,N-dioctylamide
4-hydroxymetanil-N-morpholide
4-hydroxymetanil-N-piperidide
4-hydroxy-5-methylmetanilic acid
4-hydroxy-5-methylmetanilicamide
4-hydroxy-5-methyl-N,N-dimethylmetanilamide Suitable examples of acylating agents comprise:
acetyl chloride
propionyl chloride
butyryl chloride
isobutyryl chloride
caproyl chloride
i-caproyl chloride
tert-caproyl chloride
capryloyl chloride
lauroyl chloride
palmitoyl chloride
stearoyl chloride
acryloyl chloride
methacryloyl chloride
oleoyl chloride
benzoyl chloride
o-, m-, p-fluorobenzoyl chloride
o-, m-, p-chlorobenzoyl chloride
o-, m-, p-bromobenzoyl chloride
2,3-, 2,4-, 2,5- and 2,6,3,4- and 3,5-dichlorobenzoyl chloride
2,3,4-, 2,4,5- and 2,4,6-trichlorobenzoyl chloride
2-bromo-4-chlorobenzoyl chloride
phenacetyl chloride
o-, m- and p-toluyl chloride
3-, 4-, and 5-chloro-o-toluyl chloride
4,6-dichloro-m-toluyl chloride
2-, and 3-chloro-p-toluyl chloride
2,4- and 3,5-xylylyl chloride
o-cyanobenzoyl chloride
o-, m- and p-methoxybenzoyl chloride
2- and 4-chloro-3-methoxybenzoyl chloride
2,6-dichloro-3-methoxybenzoyl chloride
2-methoxy-5-methylbenzoyl chloride
1- and 2-naphthoyl chloride
benzenesulfonyl chloride 4-fluorobenzenesulfonyl chloride
2,3 and 4-chlorobenzenesulfonyl chloride
2,4-, 2,5- and 3,4-dichlorobenzenesulfonyl chloride
2,3 and 4-bromobenzenesulfonyl chloride
o-, m-, and p-toluenesulfonyl chloride
4-chlorotoluenesulfonyl chloride
3,4,5-trichlorotoluenesulfonyl chloride
1,2-dimethylbenzenesulfonyl chloride
6-chloro-3,4-xylenesulfonyl chloride
1- and 2-naphthalenesulfonyl chloride
4-, 5- and 7-chloronaphthalenesulfonyl chloride
o-, m- and p-methoxybenzenesulfonyl chloride
5-chloro-2-methoxybenzenesulfonyl chloride
2-methoxy-3-methylbenzenesulfonyl chloride
4-methoxy-3-methylbenzenesulfonyl chloride
6-methoxy-2-naphthalenesulfonyl chloride
furoyl chloride
thiophenecarbonyl chloride
2,3 and 4-pyridinecarbonyl chloride
2 and 3-indolecarbonyl chloride
2,3,4,5,6,7 and 8-quinolinecarbonyl chloride
3 and 5-pyrazolecarbonyl chloride
4-methylpyrazolecarbonyl chloride
3-pyridazinecarbonyl chloride
4 and 5-pyrimidinecarbonyl chloride
2-pyrazinecarbonyl chloride
3-indazolecarbonyl chloride
2-phenyl-4-pyrimidinecarbonyl chloride
5-methyl-3-isoxazolecarbonyl chloride
2-methyl-4 and 5-oxazolecarbonyl chloride
benzisoxazole-3-carbonyl chloride
2-benzoxazolecarbonyl chloride
2-methyl-5- and 7-benzoxazolecarbonyl chloride
2-phenyl-5-benzoxazolecarbonyl chloride
2-furanesulfonyl chloride
2-piperidinesulfonyl chloride
2 and 3-pyridinesulfonyl chloride
1,2,3,4-tetrahydroquinoline-5-sulfonyl chloride
5 and 6-quinolinesulfonyl chloride
4-pyrazolesulfonyl chloride
3 and 5-methyl-4-pyrazolesulfonyl chloride
3 and 5-phenyl-5 and 3-pyrazolesulfonyl chloride
acetic anhydride
priopionic anhydride
butyric anhydride
isobutyric anhydride
caproic anhydride
isocaproic anhydride
and other anhydrides corresponding to the acid chlorides enumerated above.

Among the many new compounds, the following may serve to illustrate, but not in any way to limit, the range of the useful ultra-violet light absorbing agents contemplated by the present invention.

2-(2-hydroxy-5-chlorophenyl)-5-acetamido-2H-1,2,3-triazole-4-carboxamide
2-(2-hydroxy-5-chlorophenyl)-4-cyano-5-acetamido-2H-1,2,3-triazole
2-(2-hydroxy-3-methoxy-5-chlorophenyl)-5-acetamido-2H-1,2,3-triazole-4-carboxamide
2-(2-hydroxy-3-methoxy-5-chlorophenyl)-4-cyano-5-acetamido-2H-1,2,3-triazole
2-(2-hydroxy-3-methoxy-5-methyl-phenyl)-5-acetamido-2H-1,2,3-triazole-4-carboxamide
2-(2-hydroxy-3-methoxy-5-methylphenyl)-4-cyano-5-acetamido-2H-1,2,3-triazole
2-(2-hydroxy-5-sulfonamidophenyl)-5-benzenesulfonamido-2H-1,2,3-triazole-4-carboxamide
2-(2-hydroxy-5-sulfonamidophenyl)-4-cyano-5-benzenesulfonamido-2H-1,2,3-triazole
2-(2-hydroxy-3-ethyl-5-carboxyphenyl)-5-(4-pyridinecarboxamido)-2H-1,2,3-triazole-4-carboxamide
2-(2-hydroxy-3-ethyl-5-carboxyphenyl)-4-cyano-5-(4-pyridinecarboxamido)-2H-1,2,3-triazole
2-(2-hydroxy-5-ethylphenyl)-5-(1-naphthamido)-2H-1,2,3-triazole-4-carboxamide
2-(2-hydroxy-5-ethylphenyl)-4-cyano-5-(1-naphthamido)-2H-1,2,3-triazole
2-(2-hydroxy-3-cyano-5-chlorophenyl)-5-(2-naphthylsulfonamido)-2H-1,2,3-triazole-4-carboxamide
2-(2-hydroxy-3-cyano-5-chlorophenyl)-4-cyano-5-(2-naphthylsulfonamido)-2H-1,2,3-triazole
2-(2-hydroxy-3-bromo-5-octylphenyl)-5-(2-benzofuranamido)-2H-1,2,3-triazole-4-carboxamide
2-(2-hydroxy-3-bromo-5-octylphenyl)-4-cyano-5-(2-benzofuranamido)-2H-1,2,3-triazole
2-(2-hydroxy-5-sulfonylphenyl)-5-(4-chloro-2-naphthamido)-2H-1,2,3-triazole-4-carboxamide
2-(2-hydroxy-5-sulfonylphenyl)-4-cyano-5-(4-chloro-2-naphthamido)-2H-1,2,3-triazole
2-(2-hydroxy-5-dodecyloxyphenyl)-5-(3-thiophenecarboxamido)-2H-1,2,3-triazole-4-carboxamide
2-(2-hydroxy-5-dodecyloxyphenyl)-4-cyano-5-(3-thiophenecarboxamido)-2H-1,2,3-triazole
2-(2-hydroxy-5-carbamylphenyl)-5-(1-naphthalenesulphamido)-2H-1,2,3-triazole-4-carboxamide
2-(2-hydroxy-5-carbamylphenyl)-4-cyano-5-(1-naphthalenesulphamido)-2H-1,2,3-triazole As suitable vehicles for preparing pharmaceutical formulations containing the novel ultra-violet light absorbing agents of the present invention, the following may be employed: petroleum, lard, olive oil, castor oil, aquaphor, polysorb, polyethylene glycols, lanoline, cold cream, vanishing cream, hydrophilic ointment containing polyoxyl stearate, and emulsifying waxes such as CERA EMULSIFICANS, diglycol stearate, and glyceryl monostearate.

The following examples will serve to illustrate the present invention without being deemed limitative thereof.

EXAMPLE I

Preparation of the compound having the formula:

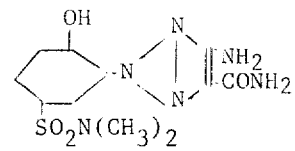

31.26 g 2-amino-4-chlorophenol hydrochloride (0.174 mole), 43.5 cc water and 29.7 cc concd. hydrochloric acid are mixed and stirred for one hour on a steam bath. The mixture is cooled to 0°C., and 32.8 cc sodium nitrite (38.5% soln.) is added. After stirring 2 hours at 0°C., excess nitrite is destroyed by treatment with 14 cc sulfamic acid (10%) soln.). 26.4 g Malonamamidine hydrochloride is then added portionwise during 5–10 min. The reaction mixture is then made neutral to Congo Red by addition of sodium acetate. After stirring for 10–12 days at room temperature the mixture is filtered, washed with 500 ml. 2% hydrochloric acid, with 500 ml. water and with 100 cc methanol to give 41.9 g dye cake having the formula:

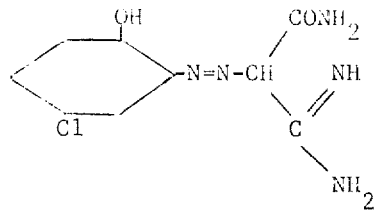

0.0435 mole of this product is heated with 12.8 g. cupric chloride dihydrate, 160 cc picoline and 12.8 cc water at 100°C. with stirring for two hours. The mixture is cooled and copper is precipitated with sodium sulfide flakes. The resulting slurry is clarified the picoline distilled off, and the residue is cooled and filtered. The solid residue is recrystallized from methoxyethanol after treatment with activated charcoal to give the desired product which melts at 234.2°–235.6°C., and has maximum extinction of K max. = 60.9 at 337 mμ.

EXAMPLE II

Preparation of the compound having the formula:

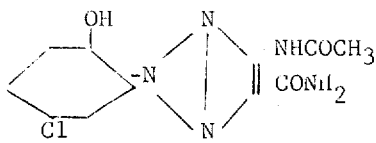

0.1 mole of the product of Example I is heated with 18.5 cc acetic anhydride, 25 cc benzene and one drop concd. nitric acid at 50°C., with stirring for 24 hours. The charge is cooled, filtered and the filter cake is washed with 25 cc hexane. The solid is air dried and recrystallized from isopropyl alcohol after treatment with activated charcoal to yield the desired product, m.p. 256.2°–261.8°C., a K max. = 36.6 at 323 mμ.

EXAMPLE III

Preparation of the compound having the formula:

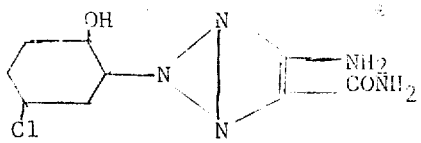

0.174 mole N,N-Dimethyl-4-hydroxymetanilamide hydrochloride (43.8g) is diazotized and coupled with 26.4 g malonamidine hydrochloride in the manner of Example I to produce the intermediate compound having the formula:

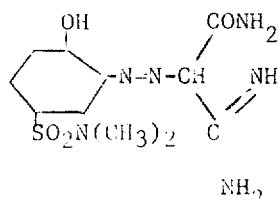

0.0435 mole of this compound is heated with 12.8 g cupric chloride dihydrate, 160 cc picoline and 12.8 cc water at 100°C., with stirring for 2 hours. The mixture is cooled, and copper is precipitated with sodium sulfide flakes. The resulting slurry is clarified, the picoline distilled off and the residue is cooled and filtered. The filler cake is recrystallized from isopropyl alcohol after treatment with activated charcoal to yield the desired product having a m.p. 241.8°–243.2°C., and a K max. = 47.4 at 334 mμ.

EXAMPLE IV

Acetylation of the product of Example III.

0.015 mole of the product of Example III is heated with 100 cc acetic anhydride containing one drop concd. sulfuric acid at 50°C., with stirring for 24 hours. The charge is cooled, filtered and the filter cake washed with 25 cc hexane. The solid product is air dried and recrystallized from methoxyethanol after treatment with activated charcoal to yield the desired product having a m.p. 279.0°–282.8°C., and a K max. = 31.0 at 316 mμ.

The product has the formula:

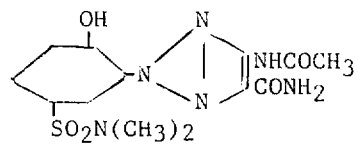

EXAMPLE V

Preparation of the pivaloyl derivative of the product of Example I.

0.025 mole of the product of Example I, 125 cc picoline and 0.075 mole pivaloyl chloride are combined and maintained at 60°C., with stirring for 4 days. The picoline is removed by steam-distillation; the residue is filtered and washed on the funnel with cold water. The solid material is recrystallized from isopropyl alcohol after treatment with activated charcoal to yield a product having the formula:

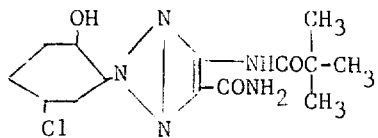

EXAMPLE VI

Preparation of the lauroyl derivative of the product of Example I.

0.025 mole of the product of Example I, 125 cc picoline and 0.075 mole lauroyl chloride are mixed together and maintained at 60°C., for 6 days with stirring. The picoline is removed by steam distillation; the residue is filtered and washed on the funnel with cold water. The solid material is recrystallized from isopropyl alcohol after treatment with activated charcoal to give a product having the formula:

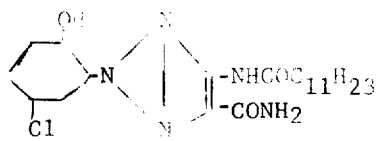

EXAMPLE VII

Benzoylation of the product of Example I.

0.025 mole of the product of Example 1, 125 cc picoline and 0.075 mole benzoyl chloride are mixed together and maintained at 60°C., for 6 days with stirring. The picoline is removed by steam distillation; the residue is filtered and washed on the funnel with cold water. The solid product is recrystallized from isopropyl alcohol after treatment with activated charcoal to give a product having the formula:

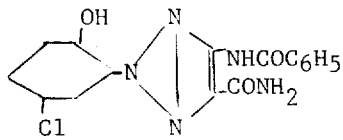

EXAMPLE VIII

Preparation of the benzenesulfonyl derivative of the product of Example I.

0.025 mole of the product of Example I is acylated in the manner of Example VI with 0.075 mole benzenesulfonyl chloride to yield a compound having the formula:

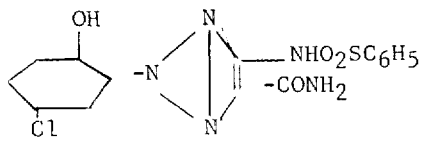

EXAMPLE IX

Preparation of the 2-furoylcarbonyl derivative of the product of Example I.

0.025 mole of the product of Example I is acylated in the manner of Example VI with 0.075 mole 2-furoylcarbonyl chloride to yield a compound having the formula:

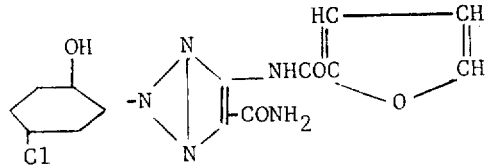

EXAMPLE X

Preparation of the 2-thiophenecarbonyl derivative of the product of Example I.

0.025 mole of the product of Example I is acylated in the manner of Example VI with 0.075 mole 2-thiophenecarbonyl chloride to produce the product having the formula:

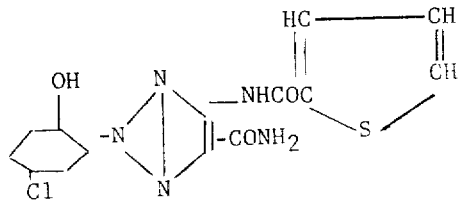

EXAMPLE XI

Preparation of the 4-pyrazolesulfonyl derivative of the product of Example I.

0.025 mole of the product of Example I is acylated in a manner of Example 6 with 0.075 mole 4-pyrazolesulfonyl chloride to yield a product having the formula:

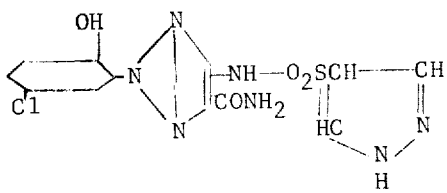

EXAMPLE XII

Dehydration of the product of Example I to the corresponding nitrile.

1.8 g of the product of Example 1 is mixed with 7.2 cc of phosphonyl chloride and maintained at 50°C for 3 hours. It is then drowned in 250 cc water, stirred 2 hours, filtered, washed with cold water, and air dried producing a reddish powder.

0.1 mole of this product is heated with 18.5 cc acetic anhydride in a manner of Example I to yield an acetyl derivative which has the probable formula:

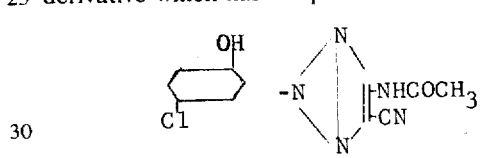

EXAMPLE XIII

Incorporation of the product of Example II into a polyoxymethylene resin.

0.3 part of the compound of Example 2 is sprinkled onto Delrin (acetal resin, duPont Co.). The mix is melted in a nitrogen atmosphere, stirred well and then allowed to cool in a mold. The resulting mold has superior light fastness in contrast to a similar mold which does not contain a UV absorber, when exposed to ultraviolet light.

EXAMPLE XIV

Incorporation of the product of Example VI into polyethylene.

0.3 part of the compound of Example VI is milled into polyethylene wax p.t. (Semet-Solvay) by dusting the ultraviolet absorbing agent onto the polyethylene on a roller maintained at a temperature of 230°C. The film is then pressed out in a Carver press to a thickness of 0.03 in. The polyethylene film is well stabilized to ultraviolet light, and admirably protects food packaged therein.

EXAMPLE XV

Incorporation of the product of Example II into nylon.

0.5 part of the compound of Example II is sprinkled onto powdered nylon 66, poly(hexamethylene adipamide). The mix is melted in a nitrogen atmosphere and stirred well. After thorough mixing, the mixture is extruded into fibers from the hot melt. A cloth is woven from said fibers and compared with a similar fabric made without an ultraviolet light absorber. The fabric containing the absorber exhibits superior light stability.

EXAMPLE XVI

Dyeing of a polyester fabric in the presence of the product of Example II.

The product of Example II is dissolved in 20 times its weight of Igepal CO-630 nonylphenoxy poly(ethyleneoxy) ethanol, GAF at 120°C, and the solution is diluted hundred - fold with water.

To 100 ml softened water at 130° F are added 1 ml Avitone T Sol 10% (long chain hydrocarbonsulfonate, duPont), 20 ml Dowicide A Sol 10% (sodium o-phenylphenolate) and 20 ml monosodium phosphate soln 10%. This is diluted to 300 ml with water. To this is added Genacron Cerise B (C.I. Direct Red 59) to produce a 3% dyeing o.w.f., and an aliquot of the above absorber dispersion to produce a 0.05% dyeing o.w.f. dacron polyester fabric (ethylene glycol terephthalic acid polyester) is placed at 150°–160°F. The pH is adjusted to 6–6.5. The temperature is raised to boiling and maintained for 1½ hours. The material is rinsed at 16°F, soaped, rinsed and dried. The dyeing which contains ultraviolet absorber shows superior ultraviolet light stability in contrast to a dyeing made without the absorber.

EXAMPLE XVII

Incorporation of the product of Example 6 into polypropylene.

Example XIV is repeated with the exception that polypropylene is employed in place of the polyethylene. The polypropylene has superior ultraviolet light absorbing properties in contrast to untreated polypropylene.

EXAMPLE XVIII

Incorporation of the product of Example II into a nitrocellulose lacquer.

A mixture of 20 parts of solution I and 80 parts of solution II is prepared wherein solution I consists of:

46 parts ½ sec. nitrocellulose
4 parts product of Example II
35 parts Cellolyn 502 (non-drying plasticizing alkyd resin, Hercules Powder Co.)
15 parts dibutyl phthalate and solution II consists of:

35 parts butyl acetate
15 parts butanol
50 parts toluene

The resulting lacquer solution is drawn out on a metal plate with a Bird film applicator to give a 3 mil film. A similar film is prepared without the absorber. Upon exposure to ultraviolet light, the latter film yellows and deteriorates before any visible signs of yellowing are observed in the film containing the absorber.

EXAMPLE XIX

Protection of skin with the product of Example VI.
The following formulation was prepared:

| | |
|---|---|
| Beeswax | 5 lb. |
| Ceresin wax | 4 lb. |
| Lanolin | 6 lb. |
| Mineral oil | 20 lb. |

2% of the product of Example VI was mixed into the above. To this was added 7½ lbs. water and 4 oz. borax to produce an emulsion which is effective in protecting the skin from sunburn.

EXAMPLE XX

Protection of skin with a product of Example II.
The following formulation was prepared:

| | |
|---|---|
| mineral oil | 1.5 parts |
| stearic acid | 2.25 parts |
| cetyl alcohol | .5 parts |
| lanoline | 1.25 parts |
| glycerine | 5 parts |
| water | 100 parts |

To this mixture, there was added 2% of the product of EXample II with good agitation. This formulation effectively protected human skin from sunburn.

The amount of the ultra violet light absorbing agent which must be incorporated in the composition to be stabilized is not particularly critical, except that a sufficient amount must be present to effect the desired degree of stabilization and no more than necessary to obtain this result should be employed. In general, between 0.1% and 10% based on the solid content of the organic material may be used, and preferably, between about 0.5% and about 2%.

We claim:

1. A compound of the formula

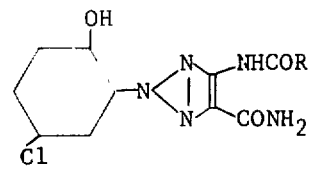

(I)

wherein R is methyl, tert-butyl, n-undecyl, phenyl, 2-furoyl or 2-thienyl or

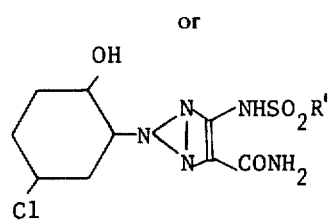

(II)

wherein R is phenyl or 4-pryazolyl or

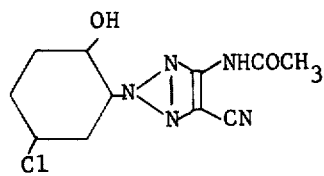

(III)

or

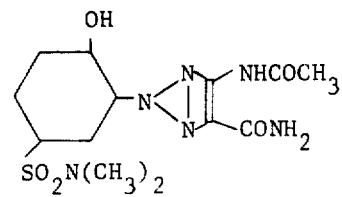

(IV)

2. A compound as defined in claim 1 wherein R is methyl.

3. A compound as defined in claim 1 wherein R is tertiary butyl.

4. A compound as defined in claim 1 wherein R is n-undecyl.

5. A compound as defined in claim 1 wherein R is phenyl.

6. A compound as defined in claim 1 wherein R is 2-furoyl.

7. A compound as defined in claim 1 wherein R is 2-thienyl.

8. A compound as defined in claim 1 wherein R' is 4-pyrazolyl.

* * * * *